US012626126B2

(12) United States Patent
 Raziperchikolaei

(10) Patent No.: US 12,626,126 B2
(45) Date of Patent: May 12, 2026

(54) COLD-START RECOMMENDATION SYSTEM USING SHARED NEURAL ITEM REPRESENTATIONS WITH FIXED WEIGHT INITIALIZATION

(71) Applicant: Rakuten Group, Inc., Tokyo (JP)

(72) Inventor: Ramin Raziperchikolaei, San Mateo, CA (US)

(73) Assignee: Rakuten Group, Inc., Tokyo (JP)

( * ) Notice: Subject to any disclaimer, the term of this patent is extended or adjusted under 35 U.S.C. 154(b) by 1147 days.

(21) Appl. No.: 17/556,954

(22) Filed: Dec. 20, 2021

(65) Prior Publication Data

US 2023/0055699 A1 Feb. 23, 2023

Related U.S. Application Data

(60) Provisional application No. 63/234,651, filed on Aug. 18, 2021, provisional application No. 63/230,676, filed on Aug. 6, 2021.

(51) Int. Cl.
 *G06N 3/08* (2023.01)
 *G06Q 30/0601* (2023.01)

(52) U.S. Cl.
 CPC ........... *G06N 3/08* (2013.01); *G06Q 30/0631* (2013.01)

(58) Field of Classification Search
 CPC .......... G06N 3/08; G06N 3/0455; G06N 3/09; G06Q 30/0631; G06Q 30/0282; G06Q 30/0251
 See application file for complete search history.

(56) References Cited

U.S. PATENT DOCUMENTS 7,987,188 B2 7/2011 Neylon et al.
8,386,336 B1 2/2013 Fox et al.
 (Continued)

FOREIGN PATENT DOCUMENTS

CN 110019652 7/2019
CN 110309331 10/2019

OTHER PUBLICATIONS

Cheng et al., "Wide & Deep Learning for Recommender Systems", DLRS '16, Sep. 15, 2016, pp. 1-4.
 (Continued)

*Primary Examiner* — Kc Chen
(74) *Attorney, Agent, or Firm* — Lessani Law Group, PC

(57) ABSTRACT

The present disclosure relates to an improved machine learning-based recommender system and method for cold-start predictions on an ecommerce platform. The improved system predicts user-item interactions with respect to cold-start items in which only side information is available. Item representations generated by an item neural network encoder from item side information are shared with a user neural network. The item representations are used, along with user feedback history, to generate user representations. Specifically, a weight matrix in the first layer of the user neural network encoder is fixed with the shared item embeddings. The effect of this is that, when the user neural network encoder is applied to an input user-item interaction vector, the output of the first layer of the user neural network encoder is a function of the item representations of the items for which the user provided positive feedback. The result is a recommender system that achieves better performance for cold-start items with fewer training iterations.

16 Claims, 6 Drawing Sheets

(56) References Cited

U.S. PATENT DOCUMENTS

| | | |
|---|---|---|
| 8,417,713 B1 | 4/2013 | Blair-Goldensohn et al. |
| 8,458,054 B1 | 6/2013 | Thakur |
| 10,354,184 B1 | 7/2019 | Vitaladevuni et al. |
| 10,614,381 B2 | 4/2020 | Hoffman et al. |
| 10,650,432 B1 * | 5/2020 | Joseph ..................... G06N 3/08 |
| 10,698,967 B2 | 6/2020 | Shen et al. |
| 10,769,524 B1 | 9/2020 | Natesh |
| 11,004,135 B1 * | 5/2021 | Sandler .............. G06Q 30/0631 |
| 11,361,365 B2 | 6/2022 | Greenwald |
| 11,651,037 B2 | 5/2023 | Shi et al. |
| 11,669,759 B2 | 6/2023 | Horowitz et al. |
| 12,277,591 B2 | 4/2025 | Shi et al. |
| 2001/0021914 A1 | 9/2001 | Jacobi et al. |
| 2005/0162670 A1 | 7/2005 | Shuler, Jr. |
| 2006/0155684 A1 | 7/2006 | Liu et al. |
| 2007/0046675 A1 | 3/2007 | Iguchi et al. |
| 2007/0087756 A1 | 4/2007 | Hoffberg |
| 2008/0270363 A1 | 10/2008 | Hunt et al. |
| 2008/0294996 A1 | 11/2008 | Hunt et al. |
| 2008/0319829 A1 | 12/2008 | Hunt et al. |
| 2009/0006156 A1 | 1/2009 | Hunt et al. |
| 2009/0018996 A1 | 1/2009 | Hunt et al. |
| 2009/0110089 A1 | 4/2009 | Green |
| 2009/0125371 A1 | 5/2009 | Neylon et al. |
| 2009/0281923 A1 | 11/2009 | Selinger et al. |
| 2010/0114933 A1 | 5/2010 | Murdock et al. |
| 2010/0268661 A1 | 10/2010 | Levy et al. |
| 2014/0104495 A1 | 4/2014 | Preston et al. |
| 2014/0195931 A1 | 7/2014 | Kwon et al. |
| 2014/0321761 A1 | 10/2014 | Wang et al. |
| 2014/0330637 A1 | 11/2014 | Moran et al. |
| 2014/0344013 A1 | 11/2014 | Karty et al. |
| 2014/0351079 A1 | 11/2014 | Dong et al. |
| 2015/0112790 A1 | 4/2015 | Wolinsky et al. |
| 2015/0154229 A1 | 6/2015 | An et al. |
| 2015/0154508 A1 | 6/2015 | Chen et al. |
| 2015/0332374 A1 | 11/2015 | Fano et al. |
| 2015/0379732 A1 | 12/2015 | Sayre, III et al. |
| 2016/0155173 A1 | 6/2016 | Isaacson et al. |
| 2016/0180248 A1 | 6/2016 | Regan |
| 2016/0292148 A1 | 10/2016 | Aley et al. |
| 2017/0185894 A1 | 6/2017 | Volkovs et al. |
| 2017/0193011 A1 | 7/2017 | Kale et al. |
| 2017/0193997 A1 | 7/2017 | Chen et al. |
| 2018/0040064 A1 | 2/2018 | Grigg et al. |
| 2018/0158078 A1 | 6/2018 | Hsieh et al. |
| 2018/0204111 A1 | 7/2018 | Zadeh et al. |
| 2018/0276710 A1 | 9/2018 | Tietzen et al. |
| 2018/0308112 A1 | 10/2018 | Prentice et al. |
| 2019/0019016 A1 | 1/2019 | Ikeda et al. |
| 2019/0034875 A1 | 1/2019 | Bryan et al. |
| 2019/0244270 A1 | 8/2019 | Kim et al. |
| 2020/0004835 A1 | 1/2020 | Ramanath et al. |
| 2020/0004886 A1 | 1/2020 | Ramanath et al. |
| 2020/0005134 A1 | 1/2020 | Ramanath et al. |
| 2020/0005149 A1 | 1/2020 | Ramanath et al. |
| 2020/0005364 A1 | 1/2020 | Aznaurashvili et al. |
| 2020/0175022 A1 | 6/2020 | Nowozin |
| 2020/0211065 A1 | 7/2020 | Govindarajalu et al. |
| 2020/0380027 A1 | 12/2020 | Aggarwal et al. |
| 2021/0004437 A1 | 1/2021 | Zhang et al. |
| 2021/0012150 A1 | 1/2021 | Liu et al. |
| 2021/0073612 A1 | 3/2021 | Vahdat et al. |
| 2021/0081462 A1 | 3/2021 | Lu et al. |
| 2021/0097400 A1 | 4/2021 | Lee |
| 2021/0110306 A1 | 4/2021 | Krishnan et al. |
| 2021/0117839 A1 | 4/2021 | Kulkarni et al. |
| 2021/0133846 A1 | 5/2021 | Xu et al. |
| 2021/0150337 A1 | 5/2021 | Raziperchikolaei |
| 2021/0191990 A1 | 6/2021 | Shi et al. |
| 2021/0350393 A1 | 11/2021 | Dagley et al. |
| 2021/0382935 A1 | 12/2021 | Huang et al. |
| 2021/0383254 A1 | 12/2021 | Renders et al. |
| 2021/0397892 A1 | 12/2021 | Huang et al. |
| 2022/0114643 A1 | 4/2022 | Raziperchikolaei |
| 2022/0155940 A1 | 5/2022 | Olbrich et al. |
| 2022/0188371 A1 * | 6/2022 | Kaza ...................... G06Q 10/10 |
| 2022/0207073 A1 | 6/2022 | Sohail et al. |
| 2022/0277741 A1 | 9/2022 | Chaudhary et al. |
| 2022/0300804 A1 | 9/2022 | Guan et al. |
| 2022/0414531 A1 | 12/2022 | Ong et al. |
| 2023/0033492 A1 | 2/2023 | Shi et al. |
| 2023/0036394 A1 | 2/2023 | Shi et al. |
| 2023/0036964 A1 | 2/2023 | Shi et al. |
| 2023/0045107 A1 | 2/2023 | Shi et al. |

OTHER PUBLICATIONS

Chopra, Sumit et al., "Learning a Similarity Metric Discriminatively, with Application to Face Verification", 2005 IEEE Computer Society Conference on Computer Vision and Pattern Recognition (CVPR'05), vol. 1. IEEE, 2005, 8 pages.

Dong, Manqing et al, "MAMO: Memory-Augmented Meta-Optimization for Cold-Start Recommendation", Proceedings of the 26th ACM SIGKDD International Conference on Knowledge Discovery & Data Mining, 2020, 10 pages.

Du, Zhengxiao et al. "Sequential Scenario-Specific Meta Learner for Online Recommendation", Proceedings of the 25th ACM SIGKDD International Conference on Knowledge Discovery & Data Mining, 2019, pp. 2895-2904.

Gao, Chen et al. "Cross-domain Recommendation Without Sharing User-relevant Data", The World Wide Web Conference, 2019, pp. 491-502.

Gharibshah, Zhabiz et al., "User Response Prediction in Online Advertising", ACM Comput. Surv., vol. 37, No. 4, Article 111, Aug. 2021, pp. 1-49.

Gopalan, Prem et al., "Scalable Recommendation with Hierarchical Poisson Factorization", UAI, 2015, 10 pages.

Kanagala, Mukhul "Product Recommendation System Using Machine Learning Techniques", California State University San Marcos, Dec. 10, 2020, pp. 1-32.

Krishnan, Adit et al., "An Adversarial Approach to Improve Long-Tail Performance in Neural Collaborative Filtering", Proceedings of the 27th ACM International Conference on Information and Knowledge Management, 2018, pp. 1491-1494.

Linden, Greg et al., "Amazon.com Recommendations: Item-to-Item Collaborative Filtering", IEEE Internet Computing, 2003, pp. 76-80.

Liu, Yudan et al. "Real-time Attention Based Look-alike Model for Recommender System", Proceedings of the 25th ACM SIGKDD International Conference on Knowledge Discovery & Data Mining, 2019, 9 pages.

Luo, Mi et al., "Metaselector: Meta-Learning for Recommendation with User-Level Adaptive Model Selection", Proceedings of The Web Conference, 2020, pp. 2507-2513.

Ma, Yifei et al., "Temporal-Contextual Recommendation in Real-Time", KDD '20, Aug. 23-27, 2020, pp. 2291-2299.

Mooney, Raymond J., et al. "Content-Based Book Recommending Using Learning for Text Categorization", Proceedings of the Fifth ACM conference on Digital Libraries, 2000, 8 pages.

Extended European Search Report dated Jan. 10, 2023, European Patent Application No. 22188265.7.

Nahta, Ravi et al., "Embedding metadata using deep collaborative filtering to address the cold start problem for the rating prediction task", Multimedia Tools and Applications, vol. 80, No. 12, Feb. 18, 2021, pp. 18553-18581.

Dong, Xin, et al. "A Hybrid Collaborative Filtering Model with Deep Structure for Recommender Systems", Proceedings of the Thirty-First AAAI Conference on Artificial Intelligence, 2017, vol. 31, No. 1, pp. 1309-1315.

Shi, Shaoyun, et al. "Attention-based Adaptive Model to Unify Warm and Cold Starts Recommendation", Proceedings of the 27th ACM International Conference on Information and Knowledge Management, 2018, pp. 127-136.

Chen, Jingyuan, et al. "Attentive Collaborative Filtering: Multimedia Recommendation with Item-and Component-Level Attention", Proceedings of the 40th International ACM SIGIR Conference on Research and Development in Information Retrieval, 2017.

(56) References Cited

OTHER PUBLICATIONS

Zhang, Shuai, et al., "Autosvd++: An Efficient Hybrid Collaborative Filtering Model via Contractive Auto-encoders", Proceedings of the 40th International ACM SIGIR Conference on Research and Development in Information Retrieval, 2017, pp. 957-960.

Barkan, Oren, et al. "CB2CF: A Neural Multiview Content-to-Collaborative Filtering Model for Completely Cold Item Recommendations", Proceedings of the 13th ACM Conference on Recommender Systems, 2019, pp. 1-9.

Wang, Hao, et al. "Collaborative Deep Learning for Recommender Systems", Proceedings of the 21th ACM SIGKDD International Conference on Knowledge Discovery and Data Mining, 2015, pp. 1235-1244.

Wang, Chong, et al. "Collaborative Topic Modeling for Recommending Scientific Articles", Proceedings of the 17th ACM SIGKDD International Conference on Knowledge Discovery and Data Mining, 2011.

Xue, Hong-Jian, et al. "Deep Matrix Factorization Models for Recommender Systems", Proceedings of the Twenty-Sixth International Joint Conference on Artificial Intelligence, vol. 17, 2017, pp. 3203-3209.

Li, Sheng, et al. "Deep Collaborative Filtering via Marginalized Denoising Auto-encoder", Proceedings of the 24th ACM International Conference on Information and Knowledge Management, 2015, pp. 811-820.

Van den Oord, Aaron, et al. "Deep content-based music recommendation", Advances in Neural Information Processing Systems 26 (2013), pp. 1-9.

Deng, Zhi-Hong, et al. "Deepcf: A Unified Framework of Representation Learning and Matching Function Learning in Recommender System", Proceedings of the AAAI Conference on Artificial Intelligence, vol. 33, No. 1, 2019.

Li, Tianyu, et al. "Deep Heterogeneous Autoencoders for Collaborative Filtering", 2018 IEEE International Conference on Data Mining (ICDM), IEEE, 2018.

Volkovs, Maksims, et al. "Dropoutnet: Addressing Cold Start in Recommender Systems", Advances in Neural Information Processing Systems, 2017, pp. 1-10.

Koren, Yehuda "Factorization Meets the Neighborhood: a Multifaceted Collaborative Filtering Model," Proceedings of the 14th ACM SIGKDD International Conference on Knowledge Discovery and Data Mining, 2008, pp. 426-434.

Strub, Florian, et al. "Hybrid Recommender System based on Autoencoders", Proceedings of the 1st workshop on Deep Learning for Recommender Systems, 2016, pp. 11-16.

Zhang, Yongfeng, et al. "Joint Representation Learning for Top-N Recommendation with Heterogeneous Information Sources", Proceedings of the 2017 ACM Conference on Information and Knowledge Management, 2017, pp. 1-10.

Blei, David M., et al. "Latent Dirichlet Allocation", Journal of Machine Learning Research, 2003, pp. 993-1022.

Chen, Minmin, et al. "Marginalized Denoising Autoencoders for Domain Adaptation", Proceedings of the 29th International Conference on Machine Learning, 2012.

Takács, Gábor, et al. "Matrix Factorization and Neighbor Based Algorithms for the Netflix Prize Problem", Proceedings of the 2008 ACM Conference on Recommender Systems, 2008, pp. 267-274.

Koren, Yehuda, et al. "Matrix Factorization Techniques for Recommender Systems", Computer, Published by IEEE Computer Society, 2009, pp. 42-49.

Lee, Hoyeop, et al. "MeLU: Meta-Learned User Preference Estimator for Cold-Start Recommendation", Proceedings of the 25th ACM SIGKDD International Conference on Knowledge Discovery & Data Mining, 2019, pp. 1073-1082.

Finn, Chelsea, et al. "Model-Agnostic Meta-Learning for Fast Adaptation of Deep Networks", Proceedings of the 34th International Conference on Machine Learning, vol. 70, 2017, pp. 1126-1135.

He, Xiangnan, et al. "Neural Collaborative Filtering", Proceedings of the 26th International Conference on World Wide Web, 2017.

He, Xiangnan, et al. "NAIS: Neural Attentive Item Similarity Model for Recommendation", IEEE Transactions on Knowledge and Data Engineering, 2018.

Raziperchikolaei, Ramin, et al. "Neural Representations in Hybrid Recommender Systems: Prediction versus Regularization", Proceedings of the 44th International ACM SIGIR Conference on Research and Development in Information Retrieval, 2021, pp. 1743-1747.

He, Xiangnan, et al. "Outer Product-based Neural Collaborative Filtering", Proceedings of the Twenty-Seventh International Joint Conference on Artificial Intelligence, 2018, pp. 2227-2233.

Salakhutdinov, Russ, et al. "Probabilistic Matrix Factorization", Advances in Neural Information Processing Systems, 2007, pp. 1-8.

Agarwal, Pankaj et al., "Personalizing Similar Product Recommendations in Fashion E-commerce", Jun. 29, 2018, 5 pages.

Bhaskar, Karthik Raja Kalaiselvi et al., "Implicit Feedback Deep Collaborative Filtering Product Recommendation System", Sep. 8, 2020, 10 pages.

Bronstein et al., "Data Fusion through Cross-modality Metric Learning using Similarity-Sensitive Hashing", 2010, pp. 1-8.

Cao et al., "Collective Deep Quantization for Efficient Cross-Modal Retrieval", Proceedings of the Thirty-First AAAI Conference on Artificial Intelligence, 2017, pp. 3974-3980.

Cao et al., "Deep Visual-Semantic Hashing for Cross-Modal Retrieval", KDD '16: Proceedings of the 22nd ACM SIGKDD International Conference on Knowledge Discovery and Data Mining, Aug. 2016, pp. 1445-1454.

Cao et al., "Correlation Hashing Network for Efficient Cross-Modal Retrieval", 2016, pp. 1-12.

Yuan, Bowen et al. "Improving Ad Click Prediction by Considering Non-displayed Events", Proceedings of the 28th ACM International Conference on Information and Knowledge Management, 2019, 17 pages.

Vincent, Pascal et al. "Stacked Denoising Autoencoders: Learning Useful Representations in a Deep Network with a Local Denoising Criterion", Journal of Machine Learning Research, 2010, pp. 3371-3408.

Ding et al., "Collective Matrix Factorization Hashing for Multimodal Data", 2014, pp. 4321-4328.

Raziperchikolaei, Ramin et al., "Shared Neural Item Representations for Completely Cold Start Problem", Fifteenth ACM Conference on Recommender Systems, 2021, pp. 422-431.

Gong et al., "Learning Binary Codes for High-Dimensional Data Using Bilinear Projections", 2013, pp. 484-491.

Guo et al., "DeepFM: A Factorization-Machine based Neural Network for CTR Prediction", Proceedings of the Twenty-Sixth International Joint Conference on Artificial Intelligence, 2017, pp. 1725-1731.

He, et al., "Neural Collaborative Filtering" Proceedings of the 26th International Conference on World Wide Web (WWW '17) [online] , Apr. 3, 2017, pp. 173-182.

He et al., "Neural Factorization Machines for Sparse Predictive Analytics", SIGIR '17, Aug. 7-11, 2017, pp. 355-364.

Vartak, Manasi et al. "A Meta-Learning Perspective on Cold-Start Recommendations for Items", Advances in Neural Information Processing Systems, 2017, 11 pages.

Jiang et al., "Deep Cross-Modal Hashing", 2017, pp. 3232-3240.

Kumar et al., "Learning Hash Functions for Cross-View Similarity Search", 2011, pp. 1-6.

Li et al., "Deep Binary Reconstruction for Cross-modal Hashing", MM '17, Oct. 23-27, 2017, pp. 1-8.

Li et al., "Deep Collaborative Filtering via Marginalized Denoising Auto-encoder", CIKM '15, Oct. 19-23, 2015, pp. 811-820.

Li et al., "Coupled Cycle-GAN: Unsupervised Hashing Network for Cross-Modal Retrieval", Thirty-Third AAAI Conference on Artificial Intelligence, 2019, pp. 176-183.

Li et al., "Deep Heterogeneous Autoencoders for Collaborative Filtering", 2018, pp. 1-6.

Li et al., "Self-Supervised Adversarial Hashing Networks for Cross-Modal Retrieval", 2018, pp. 4242-4251.

Lian et al., "xDeepFM: Combining Explicit and Implicit Feature Interactions for Recommender Systems", KDD 2018, Aug. 19-23, 2018, pp. 1-10.

(56)　　　　　References Cited

OTHER PUBLICATIONS

Liu et al., "Recommender Systems with Heterogeneous Side Information", WWW '19, May 13-17, 2019, pp. 1-7.

Long et al., "Composite Correlation Quantization for Efficient Multimodal Retrieval", SIGIR '16, Jul. 17-21, 2016, pp. 1-11.

Pan, Feiyang et al., "Warm Up Cold-start Advertisements: Improving CTR Predictions via Learning to Learn ID Embeddings", Proceedings of the 42nd International ACM SIGIR Conference on Research and Development in Information Retrieval, 2019, 10 pages.

Ricci et al., "Recommender Systems Handbook", 2011, 845 pages.

Sedhain et al, "AutoRec: Autoencoders Meet Collaborative Filtering", WWW 2015 Companion, May 18-22, 2015, pp. 1-2.

Slack, Dylan et al., "Fairness Warnings and Fair-MAML: Learning Fairly with Minimal Data", Proceedings of the 2020 Conference on Fairness, Accountability, and Transparency, 2020, pp. 200-209.

Su et al., "Deep Joint-Semantics Reconstructing Hashing for Large-Scale Unsupervised Cross-Modal Retrieval", 2019, pp. 3027-3035.

Wan et al., "Discriminative Latent Semantic Regression for Cross-Modal Hashing of Multimedia Retrieval", 2018 IEEE Fourth International Conference on Multimedia Big Data (BigMM), Oct. 21, 2018, pp. 1-7.

Wang et al., "Collaborative Deep Learning for Recommender Systems", KDD '15, Aug. 10-13, 2015, pp. 1235-1244.

Wang et al., "Effective Multi-Modal Retrieval based on Stacked Auto-Encoders", Proceedings of the VLDB Endowment, Sep. 1-5, 2014, pp. 649-660.

Wang, Huiwei et al., "ML2E: Meta-Learning Embedding Ensemble for Cold-Start Recommendation", IEEE Access, Sep. 2020, pp. 165757-165768.

Wu et al., "Quantized Correlation Hashing for Fast Cross-Modal Search", Proceedings of the Twenty-Fourth International Joint Conference on Artificial Intelligence, 2015, pp. 3946-3952.

Wu et al., "Unsupervised Deep Hashing via Binary Latent Factor Models for Large-scale Cross-modal Retrieval", Proceedings of the Twenty-Seventh International Joint Conference on Artificial Intelligence, 2018, p. 2854-2860.

Yang et al., "Shared Predictive Cross-Modal Deep Quantization", IEEE Transactions on Neural Networks and Learning Systems, vol. 29, No. 11, Nov. 2018, pp. 5292-5303.

Yin, Wenpeng "Meta-learning for Few-shot Natural Language Processing: A Survey", Jul. 2020, 7 pages.

Yu, Runsheng et al., "Personalized Adaptive Meta Learning for Cold-Start User Preference Prediction", 35th AAAI Conference on Artificial Intelligence, Feb. 2021, pp. 10772-10780.

Vilalta, Ricardo et al., "A Perspective View and Survey of Meta-Learning", Artificial Intelligence Review, Sep. 2001, pp. 77-95.

Zhang et al., "Collaborative Quantization for Cross-Modal Similarity Search", 2019, pp. 1-10.

Zhang et al., "Large-Scale Multimodal Hashing with Semantic Correlation Maximization", Association for the Advancement of Artificial Intelligence, 2014, pp. 1-7.

Antoniou,+A53:A241 Antreas et al., "How To Train Your MAML", ICLR 2019, pp. 1-11.

Bansal, Trapit et al., "Learning to Few-Shot Learn Across Diverse Natural Language Classification Tasks", Proceedings of the 28th International Conference on Computational Linguistics, Dec. 2020, pp. 5108-5123.

Bianchi, Federico et al., "Fantastic Embeddings and How to Align Them: Zero-Shot Inference in a Multi-Shop Scenario", SIGIR eCOM '20, Jul. 30, 2020, pp. 1-11.

Cai, Qi et al., "Memory Matching Networks for One-Shot Image Recognition", Proceedings of the IEEE Conference on Computer Vision and Pattern Recognition, 2018, pp. 4080-4088.

Chen, Zhihong et al. "ESAM: Discriminative Domain Adaptation with Non-Displayed Items to Improve Long-Tail Performance", Proceedings of the 43rd International ACM SIGIR Conference on Research and Development in Information Retrieval, 2020, pp. 579-588.

Zhu, Yongchun et al. "Learning to Warm Up Cold Item Embeddings for Cold-Start Recommendation with Meta Scaling and Shifting Networks", Proceedings of the 44th International ACM SIGIR Conference on Research and Development in Information Retrieval, 2021, pp. 1167-1176.

Zhang, Yang et al., "How to Retrain Recommender System? A Sequential Meta-Learning Method", Proceedings of the 43rd International ACM SIGIR Conference on Research and Development in Information Retrieval, 2020, pp. 1479-1488.

Zhang, Yin et al. "A Model of Two Tales: Dual Transfer Learning Framework for Improved Long-tail Item Recommendation", Proceedings of the Web Conference 2021, pp. 2220-2231.

Bohanec, Marko et al. "Explaining Machine Learning Models in Sales Predictions", Expert Systems with Applications 71, 2017, pp. 416-428.

Gharibshah, Zhabiz et al., "Deep Learning for User Interest and Response Prediction in Online Display Advertising", Data Science and Engineering 5.1, 2020, pp. 12-26.

Hooda, Rahul et al., "Social Commerce Hybrid Product Recommender", International Journal of Computer Applications, vol. 100, No. 12, Aug. 2014, pp. 43-49.

Meshcheryakov, N. "Machine Learning and Algorithmic Bias: A Basic Qualitative Exploration of AI, Machine Learning, Bias and Regulation", Mar. 3, 2021, 140 pages.

Zhao, Tong "Learning to Search and Recommend From Users Implicit Feedback", Aug. 2018, 209 pages.

* cited by examiner

TRAINING PHASE

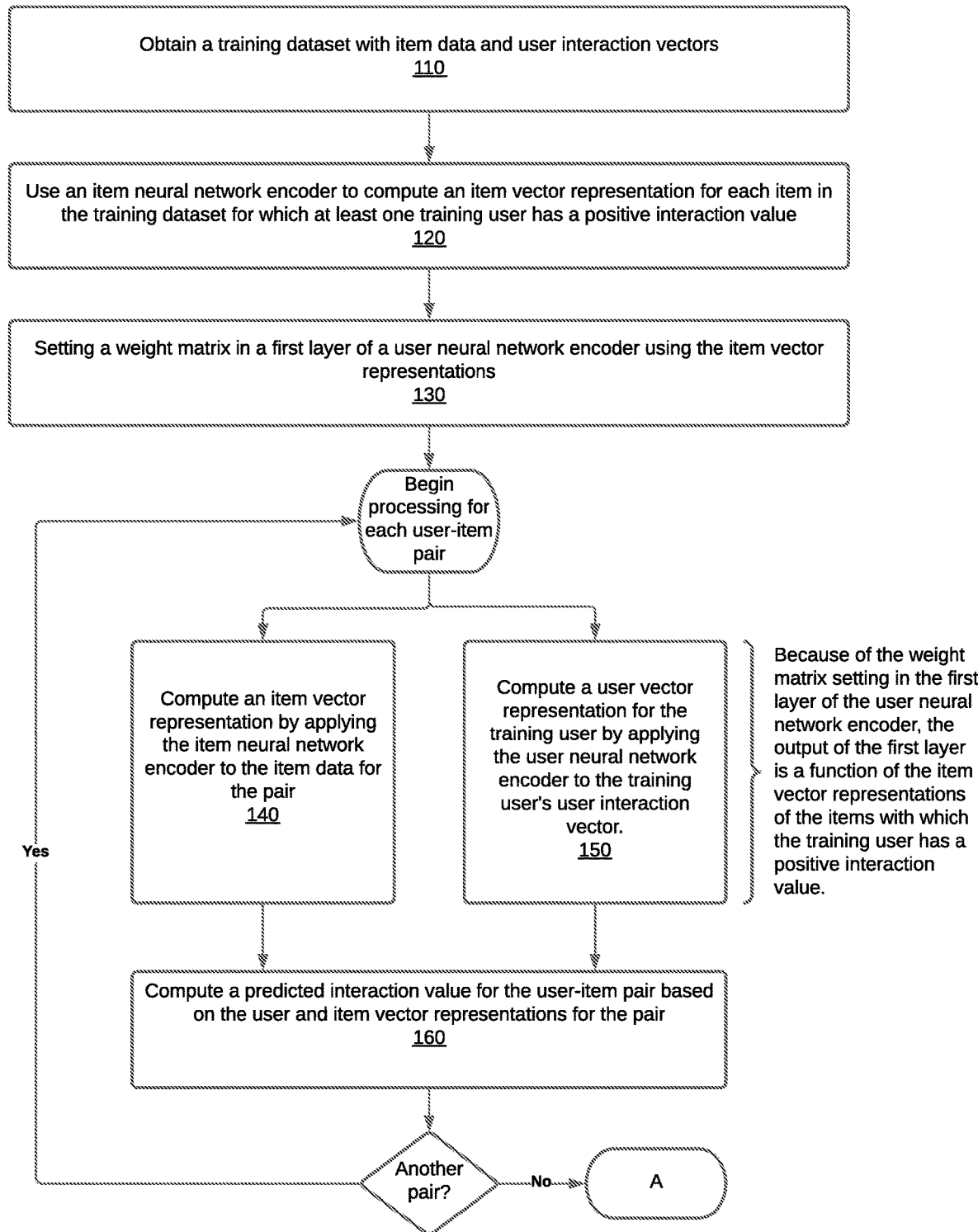

Obtain a training dataset with item data and user interaction vectors
110

Use an item neural network encoder to compute an item vector representation for each item in the training dataset for which at least one training user has a positive interaction value
120

Setting a weight matrix in a first layer of a user neural network encoder using the item vector representations
130

Begin processing for each user-item pair

Compute an item vector representation by applying the item neural network encoder to the item data for the pair
140

Compute a user vector representation for the training user by applying the user neural network encoder to the training user's user interaction vector.
150

Because of the weight matrix setting in the first layer of the user neural network encoder, the output of the first layer is a function of the item vector representations of the items with which the training user has a positive interaction value.

Compute a predicted interaction value for the user-item pair based on the user and item vector representations for the pair
160

Another pair?

Yes

Calculate a loss between predicted interaction values and actual interaction values for the user-item pairs in the training dataset
170

Adjust the trainable parameters of the user and item neural network encoders to minimize the loss
180

Repeat steps 120-180 for a number of iterations
190

PREDICTION PHASE

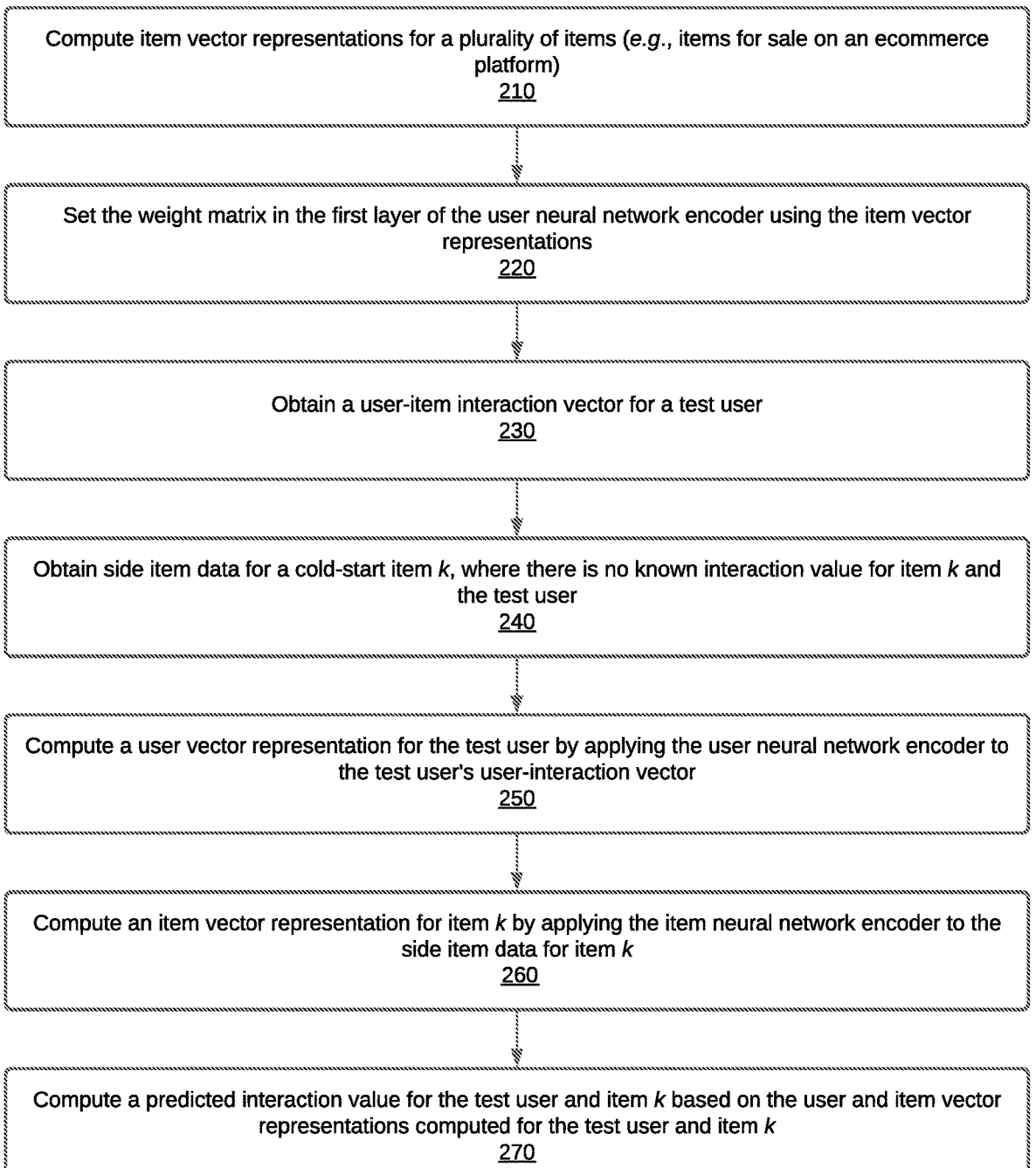

Compute item vector representations for a plurality of items (*e.g.*, items for sale on an ecommerce platform)
210

Set the weight matrix in the first layer of the user neural network encoder using the item vector representations
220

Obtain a user-item interaction vector for a test user
230

Obtain side item data for a cold-start item *k*, where there is no known interaction value for item *k* and the test user
240

Compute a user vector representation for the test user by applying the user neural network encoder to the test user's user-interaction vector
250

Compute an item vector representation for item *k* by applying the item neural network encoder to the side item data for item *k*
260

Compute a predicted interaction value for the test user and item *k* based on the user and item vector representations computed for the test user and item *k*
270

*FIG. 2*

COLD-START RECOMMENDATION SYSTEM USING SHARED NEURAL ITEM REPRESENTATIONS WITH FIXED WEIGHT INITIALIZATION

RELATED APPLICATIONS

This application claims the benefit of U.S. Provisional Application No. 63/230,676 filed on Aug. 6, 2021, and titled "Shared Neural Item Representations for Completely Cold Start Problem," the contents of which are incorporated by reference herein as if fully disclosed herein.

This application also claims the benefit of U.S. Provisional Application No. 63/234,651 filed on Aug. 18, 2021, and titled "Shared Neural Item Representations for Completely Cold Start Problem," the contents of which are incorporated by reference herein as if fully disclosed herein.

BACKGROUND OF THE INVENTION

1. Field of the Invention

This invention relates generally to machine learning-based recommender systems and, more specifically, to a recommender system that uses shared neural item representations for cold-start recommendations.

2. Description of the Background Art

Recommender systems are used on many shopping platforms. The goal of a recommender system is to take known user feedback and predict unknown user feedback on an item. The feedback, often referred to as a user-item interaction, can be implicit (e.g., purchased/likely to purchase) or explicit (e.g., a rating between 1 and 5). The predicted feedback can be used to either recommend items to users or to provided targeted advertising for items on a shopping platform.

Many recommender systems use machine learning models to make predictions. For example, neural collaborative filtering (NCF) systems apply neural network encoders to user and item data to generate representations of the user and item data, and then use the user and item representations to predict user feedback for the items.

Recommender systems may use various input sources to fulfill their tasks. One important source of information is users' previous feedback on items. For items with high sales volumes on a platform, best prediction results are often achieved when both the inputs to the user and item neural network includes feedback data. However, this does not work for "cold-start items." Cold-start items are items for which there is either no feedback history or insufficient history from which to make predictions related to the item.

To predict user-item interactions for cold start items, one known solution is to use user feedback for input to the user neural network encoder and to use item side information as input to the item neural network encoder. During training, the parameters of the neural network encoders are learned such that the encoders generate similar user and item representations for user and item pairs with known positive interactions and dissimilar representations otherwise.

Training neural networks is computationally intensive. The more training data, the better predictions. However, in the system described above, the number of encoder parameters that need to be learned during training increases almost linearly as the number of user and items increases. As entities rely more and more on recommender system, there is demand for continued performance improvement in such systems with fewer training iterations.

SUMMARY OF THE DISCLOSURE

The present disclosure relates to an improved machine learning-based recommender system and method for cold-start predictions on an ecommerce platform. The improved system predicts user-item interactions with respect to cold-start items in which only side information is available. Like known solutions, the system predicts user-item interaction values based on user and item representations generated by user and item neural network encoders, respectively. However, unlike known solutions, the item representations generated by the item neural network encoder from item side information are shared with the user neural network encoder. Specifically, instead of initializing a weight matrix in the first layer of the user neural network encoder with randomly-generated embeddings and then learning the optimal weights during training, the weight matrix is fixed with the item embeddings generated by the item neural network encoder and shared with the user neural network encoder.

To generate user representations, the user neural network is applied to an input user-item interaction vector. The input vector has a "1" value for each item with which a user has had a positive interaction and a "0" value for all other items. The combined effect of using the user-item interaction vector as input and using the shared item representations as weights in the first layer of the user neural network encoder is that the output of the first layer of the user neural network encoder is a function of the item representations of the items for which the user provided positive feedback. This is different from known systems in which the output of the first layer is a function of randomly-initialized weights that have to be learned during training. The improvements result in better performance with fewer training iterations.

In one embodiment, a method for predicting an interaction value for a user and an item comprises the following steps:

performing the following with respect to a training phase:
(a) obtaining a training dataset for training users and items, wherein the training dataset include item data for each item in the dataset and a user interaction vector for each training user, wherein the user interaction vectors are obtained from an interaction matrix with an interaction value for each user-item pair in the training dataset;
(b) using an item neural network encoder to compute an item vector representation for each item in the training dataset for which at least one training user has a positive interaction value;
(c) setting a weight matrix in a first layer of a user neural network encoder using said item vector representations;
(d) for each user-item pair in the training data set, performing the following:
computing a user vector representation by applying the user neural network encoder to the user interaction vector for the training user, wherein in computing the user vector representation for the training user, the output of the first layer of user neural network encoder is a function of the item vector representations of the items with which the training user has a positive interaction value;
computing an item vector representation by applying the item neural network encoder to item data for the item in the pair; and computing a predicted interaction value for the user-item pair based on the user and item vector representations generated for the pair;

(e) calculating a loss between predicted interaction values and actual interaction values for the user-item pairs in the training set;

(f) adjusting the trainable parameters of the item and user neural network encoders to minimize the loss;

(g) repeating steps (b)-(f) for a number of iterations;

performing the following with respect to a prediction phase:

(h) computing item vector representations for a plurality of items, wherein the item vector representations are generated by applying the item neural network encoder to item data for the items;

(i) setting the weight matrix in the first layer of the user neural network encoder using said item vector representations;

(j) performing the following with respect to a test user:

obtaining a user interaction vector for the test user;

obtaining item data for an item k for which there is no known interaction value with the test user;

computing a user vector representation for the test user by applying the user neural network encoder to the user interaction vector, wherein the output of the first layer of the user neural network encoder is a function of the item vector representations for the items with which the test user has a positive interaction value;

computing an item vector representation for item k by applying the item neural network encoder to item data for item k; and computing a predicted interaction value for the test user and item k based on the user and item vector representations computed for the test user and item.

BRIEF DESCRIPTION OF THE DRAWINGS

FIGS. 1A-1B are flowcharts that illustrate a method, according to one embodiment, for training a machine-learning model to predict user-item interaction values.

FIG. 2 is a flowchart that illustrates a method, according to one embodiment, for predicting an interaction value for a test user and an item.

DETAILED DESCRIPTION OF THE PREFERRED EMBODIMENTS

The present disclosure relates to an improved machine learning-based recommender system and method for cold-start predictions on an ecommerce platform. The improved system predicts user-item interactions with respect to cold-start items in which only side information is available. In the improved system, item representations generated by an item neural network encoder from item side information are shared with a user neural network and used, along with user feedback history, to generate user representations. The result is a recommender system that achieves better performance (e.g., better recall) for cold-start items with fewer training iterations.

The methods described herein are performed by a computer system ("the system" or the "recommender system"). Both a training phase and a prediction phase are described below for the recommender system. During the training phase, a machine-learning prediction model used by the recommender system is trained to predict user-item interactions. During the prediction phase, the model is used to predict user-item interactions with respect to cold-start items.

1. Mathematical Notations

With respect to mathematical notations used herein, let $R \in \mathbb{R}^{m \times n}$ denote a user-item interaction matrix, where m and n are the number of users and items, respectively. $R_{jk}$ is the interaction value for user j and item k. $R_{jk}=1$ means user j interacted with (e.g., purchased) item k, and $R_{jk}=0$ means the interaction is unknown. The s-dimensional side information of all the n items are denoted by $X \in \mathbb{R}^{n \times s}$. The ith row of matrix H is shown by $H_{i,:}$, and the jth column is shown by $H_{:,j}$.

The item support set of a user is the set of items for which the user has a positive interaction value. Let $I^j$ denote the items in the item support set of user j, where $N_j$ is the size of the set. The item support set of user j is shown by:

$$I_1^j, I_2^j, \dots, I_{N_j}^j.$$

2. The Prediction Model

Figure 3:
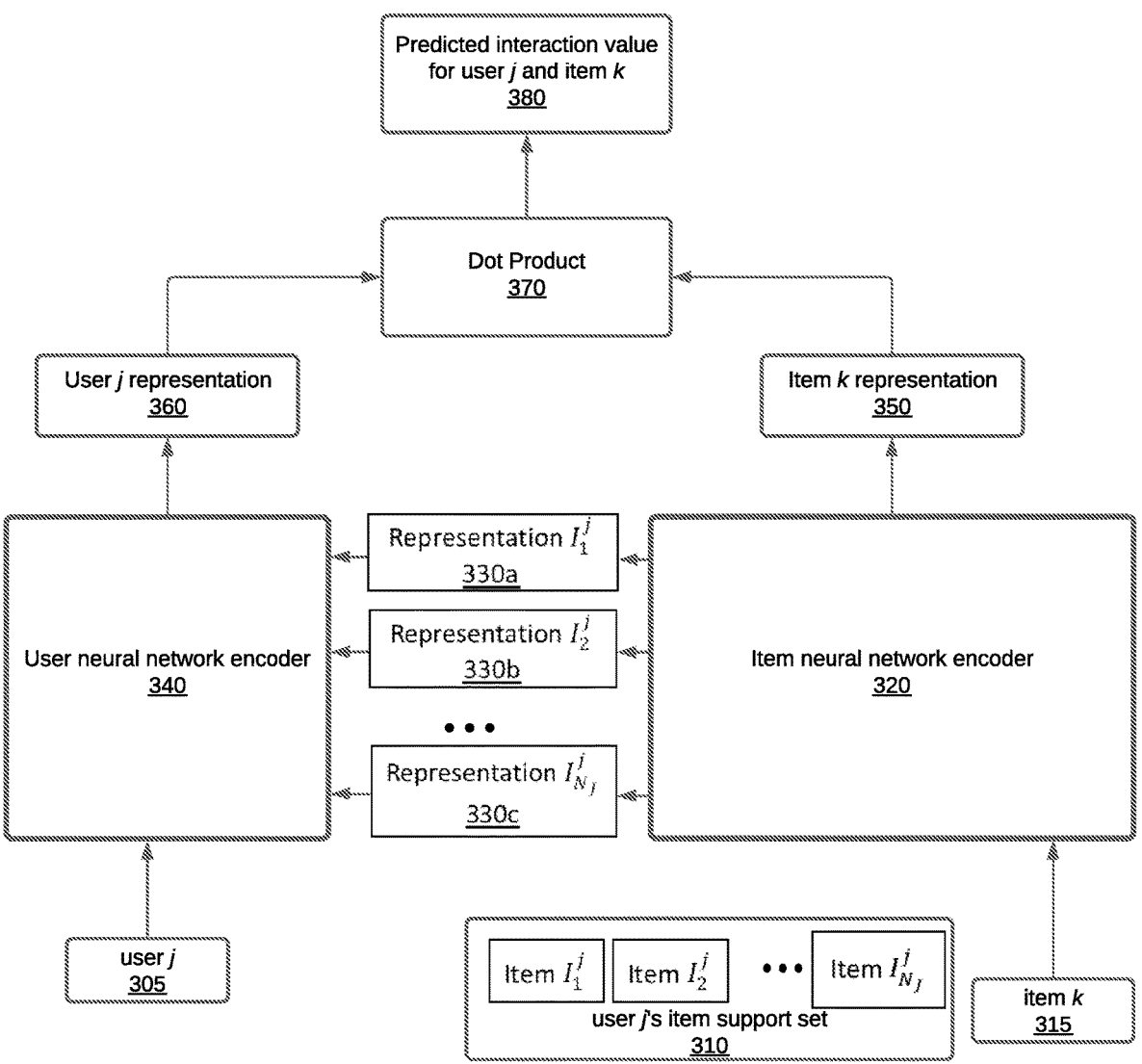
FIG. 3 is a block diagram that illustrates a machine-learning model, according to one embodiment, for predicting user-item interaction values.

The recommender system uses a machine-learning model to predict user-item interaction values ("the model" or "the prediction model"). FIG. 3 illustrates the model according to one embodiment. The model includes a user neural network encoder 340 that generates a user vector representation 360 from user input data 305 and an item neural network encoder 320 that generates an item vector representation 350 from input item data 315. As will be described below, the user representation 360 is also a function of the item representations 330a-330b generated by the item neural network encoder 320 for items 310 with which the user has a positive interaction value (e.g., items the user has previously purchased). In certain embodiments, the predicted interaction value for the user and item is the dot product 370 of the user and item representations. Training the model comprises learning the parameters of the user and item neural network encoders that provide the most accurate prediction.

3. Training Phase

FIG. 1 illustrates a method for training the prediction model used by the recommender system to make user-item interaction predictions.

2.1 Obtaining Training Data

The system obtains a training dataset with item data and user data (step 110). The item data is "side item data," which is data that describes characters of the item. Examples of side item data are product categories and subcategories.

The user data includes a user-item interaction vector for each training user. The user-item interaction vector has a "1" value for each item with which a user has had a positive interaction and a "0" value for all other items. The user interaction vectors are obtained from a user-item interaction matrix with an interaction value for each user-item pair in the training dataset. For example, take the user-item interaction matrix below for m users and n items:

TABLE 2

|  | Item 1 | Item 2 | Item 3 | . . . | Item n |
|---|---|---|---|---|---|
| User 1 | 1 | 0 | 0 | . . . | 0 |
| User 2 | 0 | 1 | 0 | . . . | 0 |
| User 3 | 0 | 0 | 0 | . . . | 0 |
| . . . | . . . | . . . | . . . | . . . | . . . |
| User m | 0 | 1 | 0 | . . . | 1 |

In the user-item matrix, "1" means a positive interaction value and "0" means an unknown interaction value. For example, in certain embodiments, a "1" means a user has purchased an item. In other embodiments, a "1" means that a user has rated an item above a threshold (e.g., 3 or more stars on a 5-star scale).

The input user-item interaction vector for user m would be row m in the matrix, which is as follows:

| 0 | 1 | 0 | . . . | 1 |
|---|---|---|---|---|

Input user-item interaction vector for user m 2.2. Generating Item Representations for Sharing with User Encoder The system uses the item neural network encoder (320) to compute an item vector representation for each item in the training dataset for which at least one training user has a positive interaction value (step 120). The item representations generated in step 120 are shared with the user neural network encoder, as described below.

2.3 Setting Weight Matrix in User Encoder Using with Item Representations

The system sets a weight matrix in a first layer of a user neural network encoder using the item vector representations generated in step 120 (step 130). Each weight vector in the weight matrix of the first layer of the user neural network encoder corresponds to an item in the training dataset. For each item for which an item representation was generated (because at least one training user has a positive interaction with the item), the weight vector corresponding to the items is the generated item representation. As will be described in more detail below, the effect of this is that, for each user, the output of the first layer of the user neural network encoder is a function of the item representations of the items with which the user has a positive interaction value.

2.4 Computing a Predicted Interaction Value for Each User-Item Pair in the Training Dataset The system computes a predicted interaction value for each user-item pair in the training dataset. This is illustrated in steps 140-160 in FIG. 1. For each user-item pair, the system computes an item vector representation by applying the item neural network encoder to the item data in the pair (step 140). Likewise, the system computes a user vector representation for the training user in the pair by applying the user neural network encoder to the training user's user-item interaction vector (step 140). Because the weight matrix in the first layer of the user neural network encoder is made up the item vector representations in the training dataset, the output of the first layer of the user neural network is a function of the item vector representations of the items with which the training user has a positive interaction value. In one embodiment, computing the output of the first layer of the user neural network encoder comprises applying a fusion function to the item vector representations of the items with which the user has a positive interaction value. The fusion function produces a single vector based on the input item vector representations. The single vector resulting from the fusion function is the output of the first layer of the user neural network encoder. As an example, the fusion function may be an average function that averages the item vector representations. Furthermore, as described in more detail in Section 2.7, the fusion function may be a weighted average function that computes a weighted average of the item vector representations based on the similarity of said item vector representations to the item vector representation of the item for which an interaction value is being predicted.

The system computes a predicted interaction value for the user-item pair based on the user and item vector representations for the pair (step 160). In one embodiment, the predicted interaction value is the dot product of the user and item representations.

2.5 Calculating Loss and Adjusting Model Parameters

The system calculates a loss between predicted interaction values and actual interaction values for the user-item pairs in the training dataset (step 170) The system adjusts the trainable parameters of the user and item neural network encoders to minimize the loss (step 180). In one embodiment, each of the user and item neural network encoders has multiple layers, where a weight matrix is associated with each layer. The weight matrices are adjustable parameters, except for the weight matrix in the first layer of the user neural network encoder. This weight matrix is fixed and only changes in response to the item representations in the training data set changing in a subsequent iteration. The system repeats steps 120-180 for a number of iterations.

Mathematically, the objective function for the model is expressed as follows:

$$\sum_{j,k \in S^+ \cup S^-} \left\| (z_j^u)^T z_k^i - R_{jk} \right\|^2 \text{ s.t.}$$

$$z_j^u = g^u(R_{j,:}) = \sigma(\ldots \sigma(\sigma(R_{j,:} W_1^u) W_2^u) \ldots W_L^u),$$

$$W_1^u = g^i(X), \, z_k^i = g^i(X_{k,:})$$

Where:

$$z_j^u$$

denotes the jth user representation;

$$z_k^i$$

denotes the kth item representation;

$R_{jk}$ denotes the actual user-item interaction value;

$g^u$ is the user neural network encoder;

$g^i$ is the item neural network encoder;

$\sigma$ is an activation function;

X is the s-dimensional side information matrix for all items in the training dataset (where s is a positive integer);

$X_k$ is the side information of the kth item; and $$W_L^u$$

is the weight matrix of the Lth layer of user neural network encoder (where L is a positive integer)

The above objective (loss) function is minimized over the parameters of the item neural network encoder, $g^i$, and the user neural network encoder, $g^u$, where the parameters of $g^u$ are $$[W_2^u \ldots , W_L^u].$$

$$W_1^u$$

is not an adjustable parameter of the user neural network encoder, as this is set with the item representations generated in step 120.

2.6 Faster Training Using Mini-Batches

In one embodiment, the user and item neural network encoders are trained using mini-batch gradient descent. In this embodiment, the training data set is divided into a plurality of mini-batches. For each mini-batch, the weight matrix in the first layer of the user neural network encoder is set based on the items in the whole training dataset with which the mini-batch users have interacted. Steps 140-150 in FIG. 1 are performed for each mini-batch.

In real-world datasets, each user has a small number of items with which he/she has a positive interaction value. Therefore, dividing the training set into a plurality of mini-batches means that the number of items for which the system needs to compute a representation in the mini-batch is small compared to the total number of items in the training dataset. This results in a faster overall training of the model.

2.7 Attention Mechanism in Learning Representations

As described above, the output of the first layer of the user neural network encoder is a function of the representations of the items for which the user has a positive interaction value. The set of items with which a user has a positive interaction is referred to herein as a user's "neighbor set of items" or "neighbor set." In certain embodiments, the representations for each of a user's neighbor set of items is weighted equally in calculating the output of the first layer of the user neural network encoder. In other embodiments, in calculating an interaction score for user j and item k, the output of the first layer is a weighted sum of the representations of the user j's neighbor set, wherein the weights are computed based on the similarity of each of user j's neighbor set to item k. In such embodiments, the objective function may be expressed as follows:

$$\sum_{j,k \in S^+ \cup S^-} \left\| (z_j^u)^T z_k^i - R_{jk} \right\|^2 \text{ s.t.}$$

$$z_j^u = g^u(\sigma(y_j)), y_j = \sum_{p \in N_j} \alpha_{pk} g^i(X_{p,:}), z_k^i = g^i(X_{k,:})$$

8

Where:

$\alpha_{pk}$ gives weight to the pth item based on its similarity to the kth item.

Cosine, dot product, or general attention mechanisms may be used learn the weights. The weight $\alpha_{pk}$ may be computed using one of the following:

$$\text{dot: } \hat{\alpha}_{pk} = (z_p^i)^T z_k^i$$

$$\text{general::} \hat{\alpha}_{pk} = (z_p^i)^T W_\alpha z_k^i$$

$$\text{cosine:} \hat{\alpha}_{pk} = \frac{(z_p^i)^T z_k^i}{\|z_p^i\| \|z_k^i\|},$$

Where $W_\alpha$ is a learnable matrix in the general attention. The final weights are achieved by applying a softmax function:

$$\alpha_{pk} = \frac{\exp(\hat{\alpha}_{pk})}{\sum_{p' \in N_j} \hat{\alpha}_{p'k}}$$

2.8 Experiments Show Improved Performance

The provisional applications incorporated by reference herein in the Related Applications section set forth results of experiments that compare the performance a recommender system that uses shared neural item representations (and trained according to the methods described herein) and a recommender system that does not use shared neural item representations. The recommender system that uses shared neural item representations as describe herein achieved better recall with fewer iterations with respect to cold start recommendations. The number of parameters that have to be learned during training of the non-shared model increases in a nearly linear fashion with the number of users and items. In contrast, since item representations are shared and used as weights in the user neural network encoder in the model described herein, the number of parameters that need to be learned during training is significantly smaller. This enables the shared model to have faster optimization and better generalization on bigger datasets.

3.0 Prediction Phase

In a prediction phase, the trained model can be used either to recommend users to shops with cold-start items for targeted advertisements or to recommend cold-start items to users on the ecommerce platform. In order to do either of these, the system needs to predict interaction values between users of the ecommerce platform and cold-start items.

FIG. 2 illustrates a method for predicting an interaction value for a test user and a cold-start item. The system computes item vector representations for items on the ecommerce platform (step 210). In one embodiment, this is done for all or substantially all the items offered for sale on the ecommerce platform. The system sets the weight matrix in the first layer of the user neural network encoder using the item vector representations (step 220). The system obtains a user-item interaction vector for a test user (step 230). The system obtains side item data for a cold-start item k (step 240). The system computes a user vector representation for the test user by applying the user neural network encoder to the test user's user-item interaction vector (step 250). The output of the first layer of the user neural network encoder is a function of the item representations for the items with which the test user has had a positive interaction. The system computes an item vector representation for cold-start item k by applying the item neural network encoder to the side item data obtained in step 240 (step 260). The system computes a predicted interaction value for the test user and cold-start item k based on the user and item vector representations computed for the test user and item (step 270).

To identify the users for who a shop should target for advertising with respect to a cold-start item, the system computes a predicted interaction value for the item and each of a plurality of users. The system then recommends to the shop a certain number or certain percentage of users with the highest probability of having a positive interaction value for the item.

To identify products to recommend to a particular user, the system computes a predicted interaction value for the user and each of a plurality of items for sale on the ecommerce platform. The system then recommends to the user a certain number of items with which the user has the highest probability of a positive interaction.

4.0 User Neural Network Architecture

Figure 4:
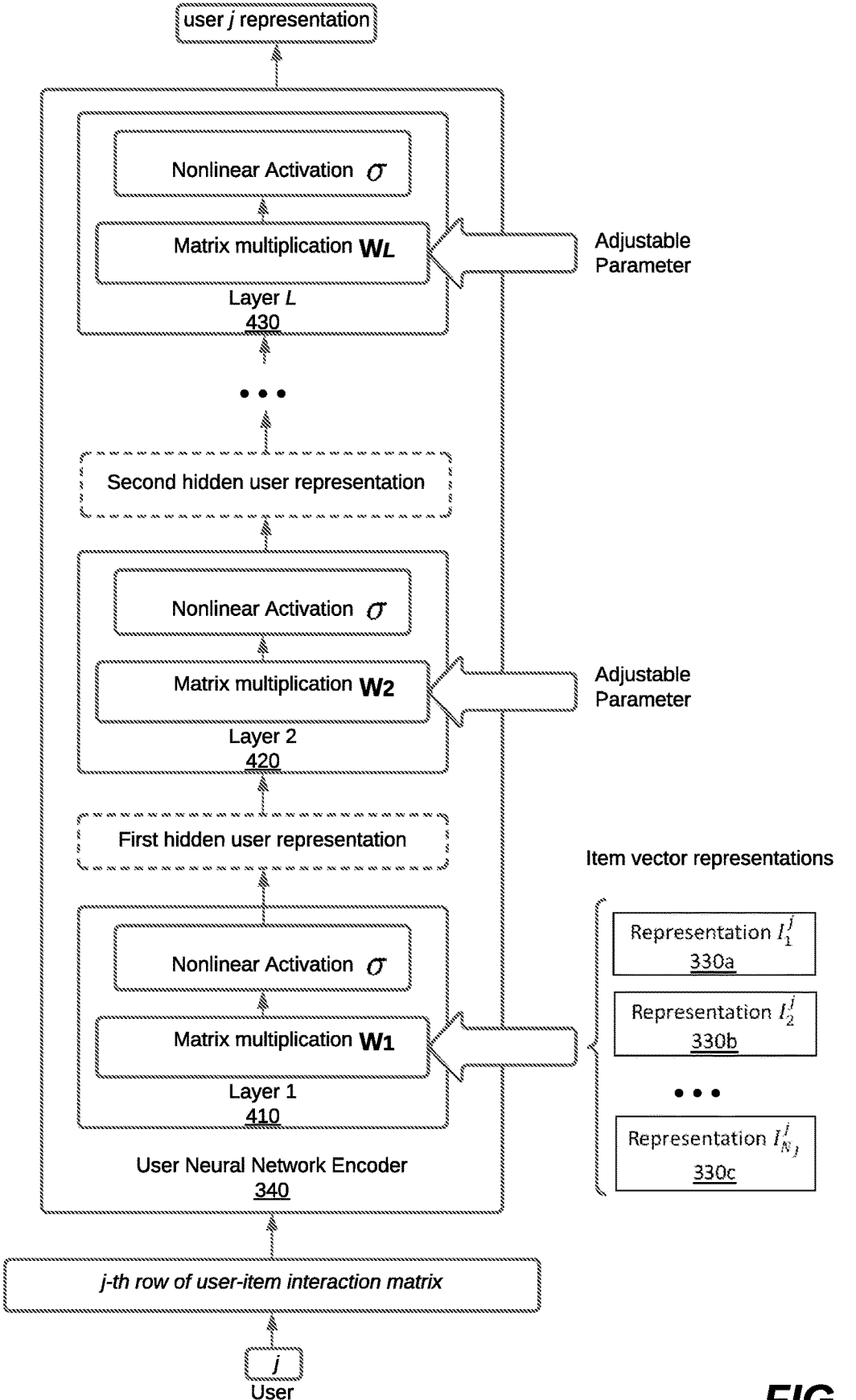
FIG. 4 is a block diagram that illustrates the architecture of the user neural network encoder according to one embodiment.

FIG. 4 illustrates the architecture of the user neural network encoder according to one embodiment. The user neural network encoder includes L layers (410, 420, . . . , 430), where L is an integer greater than 1. Each layer includes a weight matrix and a non-linear activation function. In layers 2 through L, the weight matrix is an adjustable parameter. In Layer 1, the weight matrix is set using item representation generated by the item neural network encoder.

5.0 Example System Architecture

Figure 5:
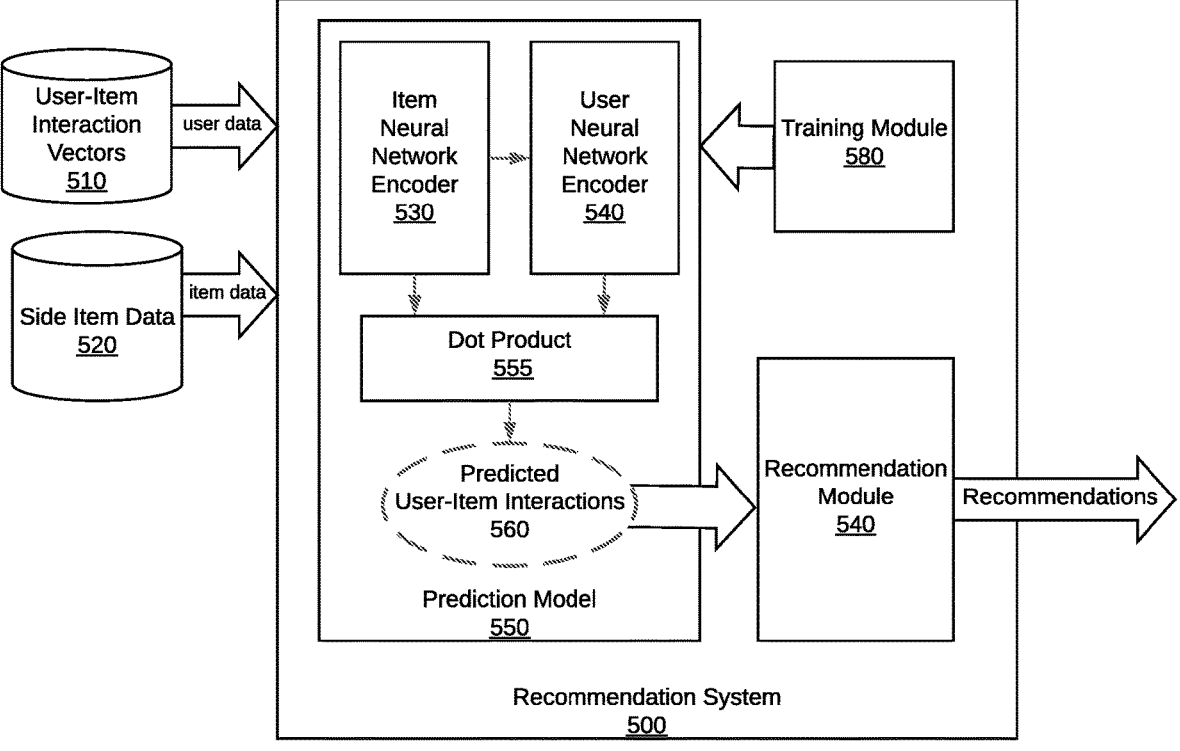
FIG. 5 is a block diagram of an example recommender system architecture according to one embodiment.

FIG. 5 illustrates an example system architecture for the recommender system. As described above, the recommender system includes a prediction model 550 that predicts user-item interactions for user-item pairs. The input to the model is side item data 520 and user-interaction vectors 510. The model's predictions are outputted in the form of user-item interaction scores 560 (e.g., similarity scores between user and item representations). The model includes item neural network encoder 530 and user neural network encoder 540. In certain embodiments, the user and item neural network encoders are multilayer perceptrons. The model also includes a dot product module 555 that calculates the dot product of the user and item representations A recommendation module for 540 receives user-item interaction scores from the prediction model 550 and uses the scores to either recommend users to shops or items to users, as described above in Section 3.0.

Figure 1B:
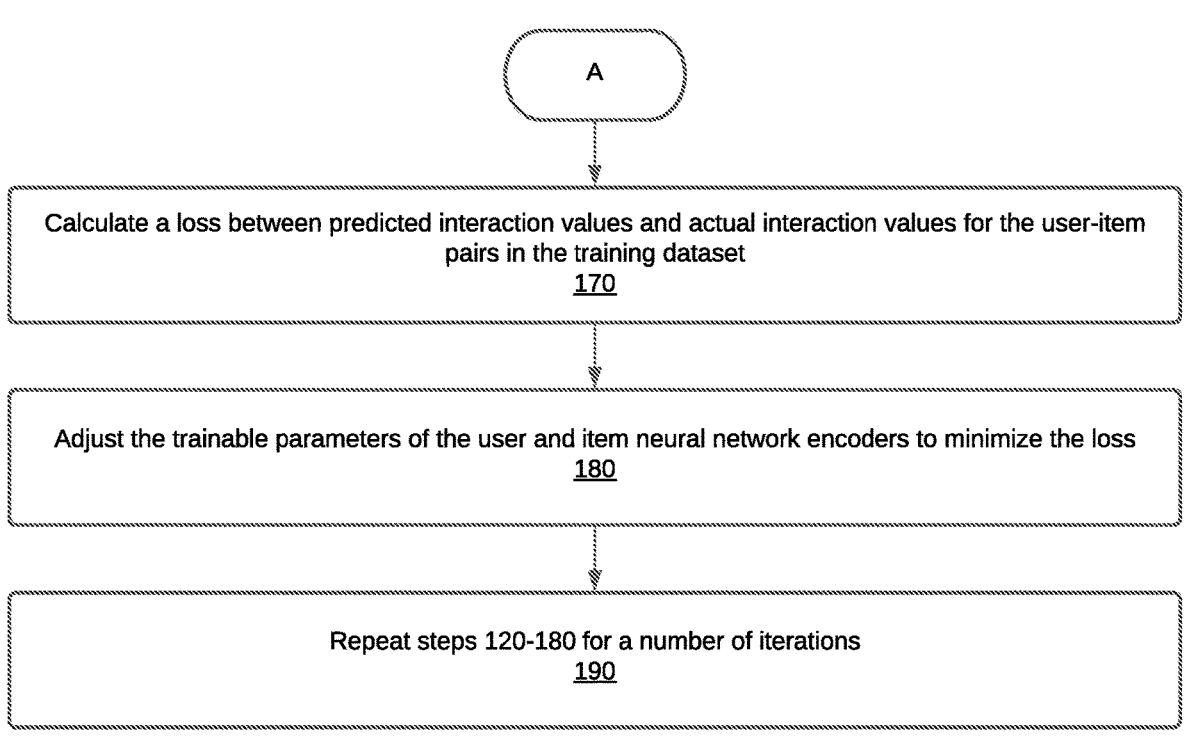

A training module 580 trains the prediction model in accordance with the method of FIGS. 1A-B.

6.0 General

The methods described with respect to FIGS. 1-5 are embodied in software and performed by a computer system (comprising one or more computing devices) executing the software. A person skilled in the art would understand that a computer system has one or more physical memory units, disks, or other physical, computer-readable storage media for storing software instructions, as well as one or more processors for executing the software instructions. A person skilled in the art would also understand that a computer system may be a stand-alone computer or a network of computers working together, such as in a client-server architecture.

As will be understood by those familiar with the art, the invention may be embodied in other specific forms without departing from the spirit or essential characteristics thereof. Accordingly, the above disclosure is intended to be illustrative, but not limiting, of the scope of the invention.

The invention claimed is:

1. A method, performed by a computer system, for predicting an interaction value for a user and an item, the method comprising: performing the following with respect to a training phase:

(a) obtaining a training dataset for training users and items, wherein the training users and the items form user-item pairs, wherein the training dataset includes item data for each item of the items in the training dataset and a user interaction vector for each training user of the training users, wherein the user interaction vector is obtained from an interaction matrix with an interaction value for each user-item pair of the user-item pairs in the training dataset;

(b) using an item neural network encoder to compute an item vector representation for each item of the items in the training dataset for which at least one training user has a positive interaction value, wherein the item neural network encoder is a multilayer perceptron;

(c) setting a weight matrix in a first layer of a user neural network encoder using item vector representations comprising the item vector representation for each item of the items, wherein the user neural network encoder is also a multilayer perceptron;

(d) for each user-item pair of the user-item pairs in the training dataset, performing the following: computing a user vector representation by applying the user neural network encoder to the user interaction vector for the training user, wherein in computing the user vector representation for the training user, output of the first layer of user neural network encoder is a function of the item vector representations of the items with which the training user has a positive interaction value; computing an item vector representation by applying the item neural network encoder to item data for an item of the items in each user-item pair of the user-item pairs; and computing a predicted interaction value for the user-item pair based on the user and item vector representations generated for each user-item pair of the user-item pairs;

(e) calculating a loss between predicted interaction values and actual interaction values for the user-item pairs in the training dataset;

(f) adjusting trainable parameters of the item and user neural network encoders to minimize the loss, wherein the weight matrix in the first layer of the user neural network encoder is fixed and excluded from said trainable parameters;

(g) repeating steps (b)-(f) for a number of iterations; performing the following with respect to a prediction phase:

(h) computing item vector representations for a plurality of items, wherein the item vector representations are generated by applying the item neural network encoder to item data for the plurality of items;

(i) setting the weight matrix in the first layer of the user neural network encoder using said item vector representations;

(j) performing the following with respect to a test user:

obtaining a user interaction vector for the test user;

obtaining item data for an item k for which there is no known interaction value with the test user;

computing a user vector representation for the test user by applying the user neural network encoder to the user interaction vector, wherein output of the first layer of the user neural network encoder is a function of the item vector representations for items of the plurality of items with which the test user has a positive interaction value;

computing an item vector representation for item k by applying the item neural network encoder to item data for item k; and computing a predicted interaction value for the test user and item k based on the user and item vector representations computed for the test user and item k.

2. The method of claim 1, further comprising:

repeating step (j) with respect to a plurality of items for which there is no known interaction value for the test user; and recommending one or more items to the test user based on the predicted interaction values computed for the test user and the plurality of items.

3. The method of claim 1 further comprising, repeating step (j) with respect to a plurality of different test users;

recommending item k to one or more of the test users based on the predicted interaction values for test users and item k.

4. The method of claim 1, wherein computing the output of the first layer of the user neural network encoder comprises:

applying a fusion function to the item vector representations of the items with which the user has a positive interaction value to map said item vector representations to a single vector; and using said single vector as the output of the first layer of the user neural network encoder.

5. The method claim 4, wherein the fusion function is an average function that averages the item vector representations.

6. The method of claim 4, wherein the fusion function is a weighted average function that computes a weighted average of the item vector representations based on the similarity of said item vector representations to the item vector representation of the item for which an interaction value is being predicted.

7. The method of claim 1, wherein the plurality of items in step (h) are items for sale on an ecommerce platform.

8. The method of claim 1, wherein item k is a cold start item.

9. The method of claim 1, wherein the predicted interaction value for a user-item pair is based on the dot product between the user vector representation and the item vector representation for the pair.

10. A non-transitory computer-readable medium comprising a computer program, that, when executed by a computer system, enables the computer system to perform the following method for training a machine-learning model to predict an interaction value for a user and an item, the method comprising:

(a) obtaining a training dataset for training users and items, wherein the training users and the items form user-item pairs, wherein the training dataset includes item data for each item of the items in the training dataset and a user interaction vector for each training user of the training users, wherein the user interaction vector is obtained from an interaction matrix with an interaction value for each user-item pair of the user-item pairs in the training dataset;

(b) using an item neural network encoder to compute an item vector representation for each item of the items in the training dataset for which at least one training user has a positive interaction value, wherein the item neural network encoder is a multilayer perceptron;

(c) setting a weight matrix in a first layer of a user neural network encoder using item vector representations comprising the item vector representation for each item of the items, wherein the user neural network encoder is also a multilayer perceptron;

(d) for each user-item pair of the user-item pairs in the training dataset, performing the following:

computing a user vector representation by applying the user neural network encoder to the user interaction vector for the training user, wherein in computing the user vector representation for the training user, output of the first layer of user neural network encoder is a function of the item vector representations of the items with which the training user has a positive interaction value;

computing an item vector representation by applying the item neural network encoder to item data for an item of the items in each user-item pair of the user-item pairs; and computing a predicted interaction value for the user-item pair based on the user and item vector representations generated for each user-item pair of the user-item pairs;

(e) calculating a loss between predicted interaction values and actual interaction values for the user-item pairs in the training dataset;

(f) adjusting trainable parameters of the item and user neural network encoders to minimize the loss, wherein the weight matrix in the first layer of the user neural network encoder is fixed and excluded from said trainable parameters; and (g) repeating steps (b)-(f) for a number of iterations.

11. The non-transitory computer-readable medium of claim 10, wherein computing the output of the first layer of the user neural network encoder comprises:

applying a fusion function to the item vector representations of the items with which the user has a positive interaction value to map said item vector representations to a single vector; and using said single vector as the output of the first layer of the user neural network encoder.

12. The non-transitory computer-readable medium of claim 11, wherein the fusion function is an average function that averages the item vector representations.

13. The non-transitory computer-readable medium of claim 11, wherein the fusion function is a weighted average function that computes a weighted average of the item vector representations based on the similarity of said item vector representations to the item vector representation of the item for which an interaction value is being predicted.

14. A non-transitory computer-readable medium comprising a computer program, that, when executed by a computer system, enables the computer system to perform the following method for predicting an interaction value for a user and an item, the method comprising:

(a) computing item vector representations for a plurality of items, wherein the item vector representations are generated by applying an item neural network encoder to item data for the plurality of items, wherein the item neural network encoder is a multilayer perceptron;

(b) setting a weight matrix in a first layer of a user neural network encoder using said item vector representations, wherein the user neural network encoder is also a multilayer perceptron;

(c) performing the following with respect to a test user: obtaining a user interaction vector for the test user; obtaining item data for an item k for which there is no known interaction value with the test user; computing a user vector representation for the test user by applying the user neural network encoder to the user interaction vector, wherein output of the first layer of the user neural network encoder is a function of the item vector representations for items of the plurality of items with which the test user has a positive interaction value; computing an item vector representation for item k by applying the item neural network encoder to item data for item k; and computing a predicted interaction value for the test user and item k based on the user and item vector representations computed for the test user and item k;

(d) repeating step (c) with respect to a plurality of items for which there is no known interaction value for the test user, and with respect to a plurality of different test users;

(e) in response to repeating step (c) with respect to a plurality of items for which there is no known interaction value for the test user, recommending one or more items to the test user based on the predicted interaction values computed for the test user and the plurality of items; and (f) in response to repeating step (c) with respect to a plurality of different test users, recommending item k to one or more of the test users based on the predicted interaction values for test users and item k.

15. A system for predicting user-item interaction values on an ecommerce platform comprising: a processor configured to execute instructions programmed using a set of machine codes; one or more memory units coupled to the processor; and a machine-learning model, stored in the one or more memory units of the system, that takes a user input and an item input and outputs a predicted user-interaction value for users and items on the ecommerce platform, wherein the machine-learning model includes computational instructions implemented in the machine code for generating the output, and wherein the machine-learning model is trained according to a method that comprises the following:

(a) obtaining a training dataset for training users and items, wherein the training users and the items form user-item pairs, wherein the training dataset includes item data for each item of the items in the training dataset and a user interaction vector for each training user of the training users, wherein the user interaction vector is obtained from an interaction matrix with an interaction value for each user-item pair of the user-item pairs in the training dataset;

(b) using an item neural network encoder to compute an item vector representation for each item of the items in the training dataset for which at least one training user has a positive interaction value, wherein the item neural network encoder is a multilayer perceptron;

(c) setting a weight matrix in a first layer of a user neural network encoder using item vector representations comprising the item vector representation for each item of the items, wherein the user neural network encoder is also a multilayer perceptron;

(d) for each user-item pair of the user-item pairs in the training dataset, performing the following:
computing a user vector representation by applying the user neural network encoder to the user interaction vector for the training user, wherein in computing the user vector representation for the training user, output of the first layer of user neural network encoder is a function of the item vector representations of the items with which the training user has a positive interaction value;
computing an item vector representation by applying the item neural network encoder to item data for an item of the items in each user-item pair of the user-item pairs; and
computing a predicted interaction value for the user-item pair based on the user and item vector representations generated for each user-item pair of the user-item pairs;

(e) calculating a loss between predicted interaction values and actual interaction values for the user-item pairs in the training dataset;

(f) adjusting trainable parameters of the item and user neural network encoders to minimize the loss, wherein the weight matrix in the first layer of the user neural network encoder is fixed and excluded from said trainable parameters; and (g) repeating steps (b)-(f) for a number of iterations.

16. The system of claim 15, wherein computing the output of the first layer of the user neural network encoder comprises:
applying a fusion function to the item vector representations of the items with which the user has a positive interaction value to map said item vector representations to a single vector; and
using said single vector as the output of the first layer of the user neural network encoder.

* * * * *